US006635867B2

(12) United States Patent
Kajita

(10) Patent No.: US 6,635,867 B2
(45) Date of Patent: Oct. 21, 2003

(54) ATOMIC FOUNTAIN APPARATUS

(75) Inventor: Masatoshi Kajita, Tokyo (JP)

(73) Assignee: Communications Research Laboratory Independent Administrative Institution, Tokyo (JP)

( * ) Notice: Subject to any disclaimer, the term of this patent is extended or adjusted under 35 U.S.C. 154(b) by 24 days.

(21) Appl. No.: 10/051,105

(22) Filed: Jan. 22, 2002

(65) Prior Publication Data

US 2002/0125418 A1 Sep. 12, 2002

(30) Foreign Application Priority Data

Feb. 1, 2001 (JP) ....................................... 2001-025191

(51) Int. Cl.[7] .............................. H05H 3/02; H01S 1/00
(52) U.S. Cl. ....................................................... 250/251
(58) Field of Search ............................ 250/251, 423 R; 331/93, 94.1

(56) References Cited

U.S. PATENT DOCUMENTS 5,101,103 A * 3/1992 Johnson et al. ............. 250/251
5,338,930 A * 8/1994 Chu et al. ................... 250/251
5,528,028 A * 6/1996 Chu et al. ................... 250/251

FOREIGN PATENT DOCUMENTS

JP H06-112551 * 4/1994
JP 2001-68054 * 3/2001

OTHER PUBLICATIONS

Takao Morikawa, "Cesium Primary Frequency Standard and Frequency Accuracy", Journal of the Communications Research Laboratory, vol.45, No. 1, 2, (Mar. 30, 2000 Japan), pp 27–35.*

Masatoshi Kajita et al., Atomic Collimation with a Single Laser Pulse, Communications Research Laboratory, 4–2–1 Nukui –Kitamachi, Koganei, Tokyo 184–8795, Japan (Received Aug. 13, 1999; accepted for publication Sep. 13, 1999), pp. L1281–L1283.

Masatoshi Kajita et al., 3rd International Conference on Time & Frequency, Feb. 6, 2001, at New Delhi, digest of "Collimation of Cs Fountain with an Single Infrared Laser".

* cited by examiner

*Primary Examiner*—Nikita Wells

(57) ABSTRACT

An atomic fountain apparatus laser trapping, cooling and tossing upward atoms with a plurality of laser beams comprises a collimation laser generating section and a microwave resonator. The atoms fall back through a microwave resonator are observed. The collimation laser generating section generates a laser beam of a frequency that does not resonate with the atoms. The collimation laser beam output by the collimation laser generating section is applied to the atoms in the direction of the tossed atoms, and the switch is turned off before the atoms reaches the microwave resonator.

7 Claims, 9 Drawing Sheets

POWER DISTRIBUTION OF LASER BEAM

CHANGE OF POSITION

CHANGE OF VELOCITY

ONE DIMENSIONAL MODEL

TWO DIMENSIONAL MODEL

ATOMIC FOUNTAIN APPARATUS

CROSS REFERENCE TO RELATED APPLICATION

This application claims priority Japanese Patent Application No. 2001-025191, filed Feb. 1, 2001 in Japan, the contents of which are incorporated herein by reference.

BACKGROUND OF THE INVENTION

1. Field of the Invention

This invention relates to an atomic fountain apparatus, especially to a cesium atomic fountain apparatus.

Frequency standards using cesium atoms have been widely used hitherto because of their high precision. With the progress of technologies in recent years, their accuracy requirements have been more and more strict, and more accurate frequency standards have been demanded.

2. Description of the Related Art

FIG. 9 shows the operating principle of a prior art beam-type cesium frequency standard. In FIG. 9, reference numeral 80 refers to a container, 81 refers to a microwave resonator, 82 refers to a cesium atomic-beam, and 83 refers to a microwave, respectively.

When the cesium atomic beam 82 is input into the microwave resonator 81, the cesium atomic beam 82 interacts with the microwave 83, causing the cesium atoms having two energy levels to resonate with the frequency of the microwave. The cesium atoms are allowed to jump from one energy level to the other energy level by the resonance. The frequency of the microwave resonating with the cesium atoms is approximately $9.192\times10^{9}$ Hz (approximately 9 GHz) which provides a standard of time for an atomic clock. With this standard, an error of one second is caused in several millions of year ($10^{14}$~$10^{15}$ seconds).

Because the atoms whose state was altered with the resonance absorb a light, this state can be detected, for example, by irradiating a light. When no resonated, the atoms do not absorb the light. When irradiated a light to an atom of which energy state is changed by the micro wave resonance, the light is absorbed and fluorescent light is emitted. However, in an atomic of no resonant state, the fluorescent light is not emitted.

In the conventional beam type frequency standards, frequency shifts or frequency fluctuations often occur due to the Doppler effect and other factors. As is well known, there are two kinds of the Doppler effect, one is the primary effect caused by moving, and another is the secondary effect based on the relativity. According to the quantum theory, each of the energy levels of cesium atom, which usually take discrete values, has a uncertainty width, which tends to be reduced with increases of interaction time (measuring time). Having an uncertainty in each energy state has an uncertain width may cause the frequency fluctuation within a certain width of Lorentz distribution, posing an accuracy problem.

Recent research and development efforts for improving such standards are aimed mainly at an atomic fountain type standard. This type of technology has been realized by the progress of laser cooling technology, which may produce gas atoms cooled to very low temperatures of mean velocity of a few centimeter per second equivalent to a few $\mu$K. By using such cryogenic atoms, not only a very long interaction time can be obtained, but also frequency shift due to the secondary Doppler effect can be reduced, so that high accuracy frequency standards can be realized. In such a case, because neutral atoms cannot be held at the same position such as by interaction in ion traps, the cesium atoms are tossed up vertically so as to pass through the microwave resonator. This method of tossing up atoms is called the atomic fountain type (or the atomic fountain system).

The atomic fountain type is characterized in that the spectral line width can be very narrow and the Doppler effect can be reduced by using atoms whose velocity (<5 m/sec) is considerably slower than that (250 m/sec) in the beam-type frequency standards.

Slow atoms can be realized by laser cooling. The laser cooling is a cooling method of atoms by using forces that the atoms receive, when absorbing or emitting a light. The cesium atoms can be cooled to temperatures near absolute zero, using the laser cooling. When an atom is irradiated with a laser beam, the atom absorbs the light and receives a force in the direction of the light traveling, and ground state electrons of the atom are excited. The electrons fall to the ground state, emitting fluorescent light uniformly in all direction. Because the momentum is always conservative in each direction, which means the atom receives a force in the reverse direction of the laser irradiating direction. Using the effect, the movement of the atom can be controlled to be still by laser irradiating from each positive and negative directions of x, y and z axis.

When irradiated by two laser beams of a frequency slightly below the resonance frequency in opposite directions, atoms absorb laser beam in one direction and do not absorb laser beam in the other direction under the influence of the Doppler shift. As the result, the atoms receive forces so that the atoms come to a halt, even if they are moving in any direction. Thus the temperature of the atoms is lead to a drop.

FIGS. 10A, B and C shows drawings explaining the atomic fountain type. Now assume that a certain velocity is given to an atom $\chi$, and a laser beam of a frequency of $\nu-\Delta\nu+\delta N$ is applied to the atom in one direction, while another laser beam of a frequency of $\nu-\Delta\nu-\delta N$ is applied to it in the other direction, as shown in FIG. 10A. At this time, the velocity of the atom $\chi$ becomes zero when viewed from a person who is still on the coordinates moving at a velocity of $\nu_0=c\delta N/N$ (that is, when viewed from a moving person), where c is the velocity of light. In other words, when viewed from a person in the laboratory, the velocity of $\nu_0$ is given to the atom $\chi$.

In practice, laser cooling is carried out in six directions, and cesium atoms are tossed upward (like a fountain) at a velocity of $\nu_0$ by changing the frequency in the vertical direction, as shown in FIG. 10B. FIG. 12C shows the atomic fountain of the tossed cesium atoms up, which pass through a microwave generator.

FIG. 11 is an external view of a conventional atomic fountain type cesium frequency standard. In the figure, reference numeral 90 refers to a magnetic shield, 91 refers to a uniform field generator, 92 refers to a microwave resonator, 93 refers to a magneto-optical trap, 94 refers to an input section of a laser beam applied to cesium atoms in six directions in a magneto-optical trap, 95 refers to a signal detector, and 96 refers to an ion pump, respectively. Tossing the cesium atoms in the vertical direction can be realized by a resultant forces of vertical direction components of forces caused by laser beams from four directions of the input sections of the laser beam 94.

The atomic fountain is accomplished by three steps of laser capture (trap), cooling and vertical launch. As the trap of the atoms, a magneto-optical trap 93, which traps cesium atoms by irradiating with laser beams in six directions in an inhomogeneous magnetic field which has a minimum magnetic field, is used. The captured atoms are cooled by polarized gradient cooling to a temperature below the Doppler limit (laser cooling). Polarized gradient cooling is carried out by using an optical molasses comprising six laser beams having the same frequency. Furthermore, when the frequency of the laser beam irradiated in a downward direction is set less than the frequency of the laser beam irradiated in a upward direction, a moving molasses can be realized, that is, the atoms can be tossed upward while maintaining very low temperatures. The atoms pass twice through the microwave resonator 92 disposed on the upper part, once the way up and once the way down, and a Ramsey resonance signal is observed in the signal detector 95 placed under the magneto optical trap 93. In the atomic fountain type, a spectral line width as narrow as approximately 1 Hz can be obtained because the interaction time is a period the atoms float in the microwave resonator 92.

Problems associated with the aforementioned conventional atomic fountain type will be described in the following, referring to an external view of the conventional atomic fountain type cesium frequency standard shown in FIG. 10. The atoms launched under thee microwave resonator 2 pass through a hole of an approximate 1-cm diameter hole provided on the microwave resonator 92 and continue traveling upward to a top at which the energies is lost to fall down. Since the atoms passing through the hole and moving upward shift in the horizontal direction because of the horizontal components of the velocity, not all of the descending atoms return to the position of the hole on the microwave resonator 92, with only about 10% of them actually returning to the hole. The signal detector 95, on the other hand, detects only those atoms which fall down and passing through the hole on the microwave resonator 92 again among the atoms which have been launched and passed through the hole. As the result, the conventional atomic fountain type has an essential problem that the detected spectrum signal is so small that the S/N ratio is not enough.

SUMMARY OF THE INVENTION

An object of the present invention is to provide an atomic fountain apparatus that can improve the S/N ratio of the spectrum by suppressing the diffusion of the launched atoms in the horizontal direction.

In the present invention, the launched atoms are irradiated with a laser beam in the direction of the launched atoms to collimate the atoms. Irradiated continuously with the collimating laser beam, the atoms hardly diffuse horizontally, however the presence of the field of light may shift the observed frequency for measuring atoms. It is a problem to be solved.

Another object of the present invention is to solve the problem for the atomic fountain apparatus.

Atomic fountain apparatus of the present invention comprises a collimation laser generating section for generating a laser beam of a frequency that does not resonate with the atoms. The collimation laser beam output by the collimation laser generating section is applied to the atoms in the direction of the tossed atoms.

Moreover an atomic fountain apparatus for laser trapping, cooling and tossing atoms with a plurality of laser beams and comprising a microwave generator. The atoms passe upward and fall back through a microwave resonator are observed. The atomic fountain apparatus comprises a collimation laser generating section for generating a laser beam of a frequency that does not resonate with the atoms. Further it comprises a switch for controlling on and off of the irradiation of the laser beam output from the collimation laser generating section. The collimation laser beam output by the collimation laser generating section is applied in the direction of the tossed atoms. The switch is turned off before the atoms reaches the microwave resonator.

The present invention allows almost all the launched atoms to return to the hole of the microwave resonator by reducing the horizontal velocity component of the atomic fountain using the dipole force generated by the electrical field of the laser beam. The S/N ratio is improved by the collimation of the atoms.

According to the present invention, the velocity component in the direction vertical to laser beam is suppressed using a dipole force caused with a laser beam, so it is possible to improve the S/N ratio and consistently guarantee an accuracy of one second error in several million years.

The objects, advantages and features of the present invention will be more clearly understood by referencing the following detailed disclosure and the accompanying drawings.

DETAILED DESCRIPTION OF THE PREFERRED EMBODIMENTS

Figure 1:
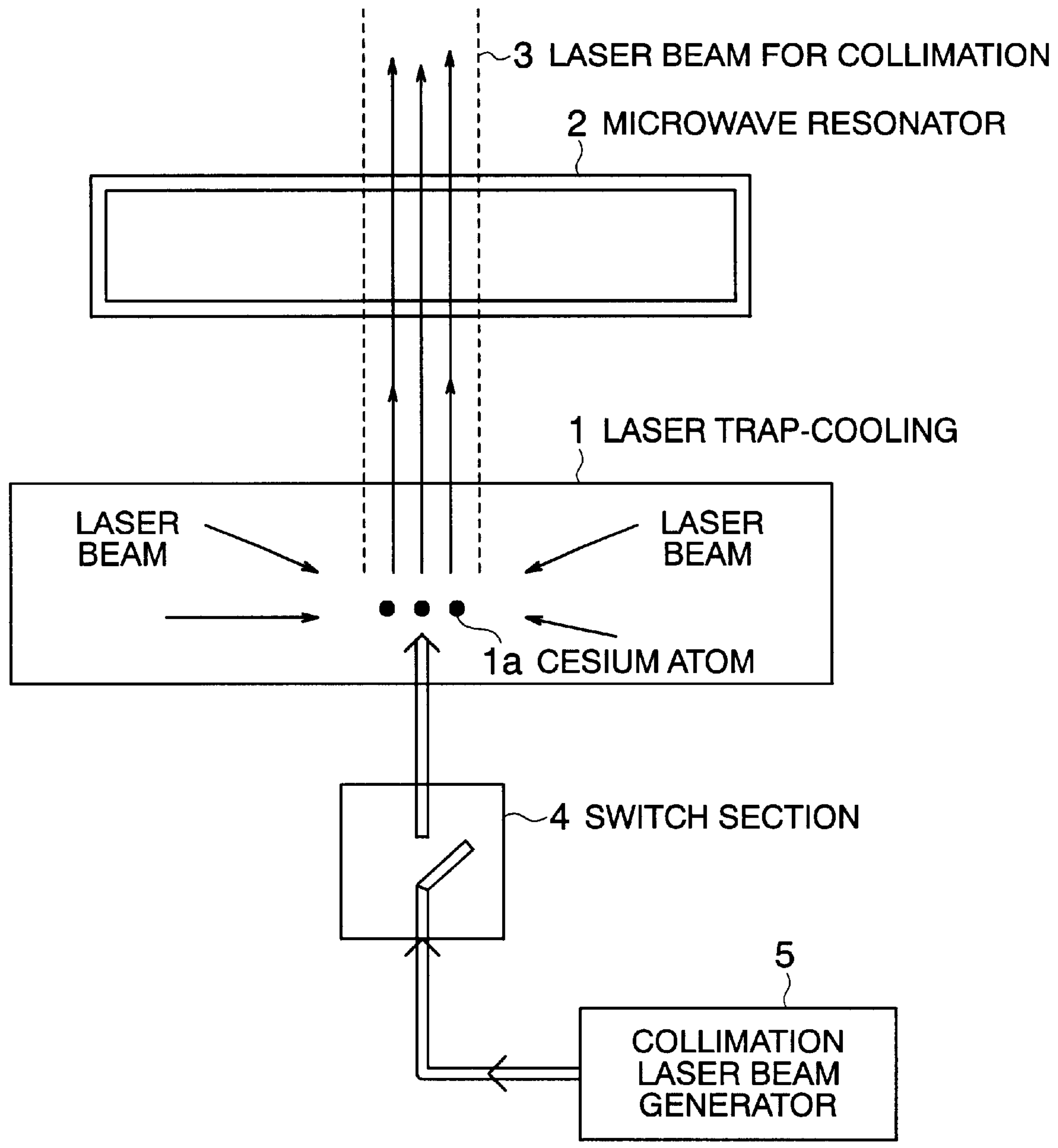
FIG. 1 shows an operating principle of the present invention.

FIG. 1 shows the operating principle of the present invention. In FIG. 1, reference numeral 1 refers to a laser trap-cooling section, 1*a* shows a plurality of cesium atoms, 2 refers to a microwave resonator, 3 refers to a collimation laser beam in a direction of the launched atoms. The collimation laser beam prevents the launched atoms to diffuse in the direction vertical to the launched direction. 4 refers to a switch to turning on and off the laser generated by the collimation laser generating section 5, and 5 refers to a collimation laser generating section for generating the collimation laser beam 3. Needless to say, the environment where the cesium atoms 1*a* exist and move, such as the laser trap-cooling section 1, is kept almost vacuum.

Atoms receive two forces from the photons of laser beam, that is, one is scattering force (i), and another is dipole force (ii).

The scattering force (i) is a force generated when the kinetic momentum of atoms varies by the kinetic momentum as the atoms absorb and release photons. It is not a conservative force, and is used mainly for laser cooling and also for acceleration.

The dipole force (ii) is caused by the second order Stark effect, which is produced as atoms is influenced by the electric field of a light. When the frequency of the light is considerably lower than the transition frequency of atoms, a potential U expressed by the following equation (1) is caused, where $\alpha$ is a polarizability of atoms with respect to a d-c electric field. E is an electric field.

$$U(x, y, z)=-\alpha E(x, y, z)^2/2 \quad (1)$$

Since this dipole force is a conservative force, the phase space volume (a product of velocity distribution and displacement distribution) does not change. It is possible, however, to narrow the velocity distribution while expanding the positional distribution. In the present invention, the velocity components vertical to the laser beam is reduced by the dipole force caused with the laser beam. Atoms comprise atomic nuclei and electrons, and produce induced electric dipoles when exposed to an electric field by a laser beam. This dipole force acts as an attraction force, and the atoms are attracted toward the stronger power region of the laser beam.

Figure 2A:
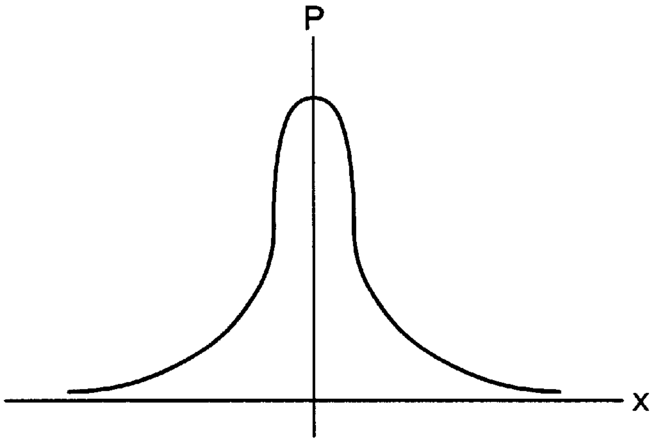
FIG. 2A shows an example of a power distribution of laser beam for collimating atoms of atomic fountain.

FIG. 2A shows a power distribution to distance from a beam center of a laser beam for collimating the atoms of atomic fountain in one dimensional model. The power distribution has characteristics of Gaussian distribution, as expressed by the following equations (2) and (3) where P denotes a power density, $P_0$ is the maximum value of the power density, x is a distance, $\Delta x$ is the radius of the laser beam, and E is an electric field.

$$P=P_0 \exp[-(x/\Delta x)^2] \quad (2)$$

$$E=E_0 \exp[-(x^2)/2(\Delta x)^2] \quad (3)$$

The force of the atoms received with the laser beam can be expressed by the following equation (4).

$$-(\alpha E_0^2/\Delta x)\cdot x\cdot \exp[-x^2/(\Delta x)^2] \quad (4)$$

Since the value in exp is almost 1 when $x<<\Delta x$ approximately, this equation (4) becomes the following equation (5), which is identical to the harmonic oscillator.

$$-\frac{\alpha E_0^2}{\Delta x}x \quad (5)$$

The position x(t) in this case can be expressed by the following equation (6) where x(0) is the initial position and $v_x(0)$ is the initial velocity.

$$x(t)=x(0)\cos \omega t+[v_x(0)/\omega]\sin \omega t \quad (6)$$

The velocity $v_x$ in the x direction here can be expressed by the following equation (7) by differentiating Equation (6).

$$v_x(t)=v_x(0)\cos \overline{\omega}t-x(0)\overline{\omega} \sin \omega t \quad (7)$$

Figure 2B:
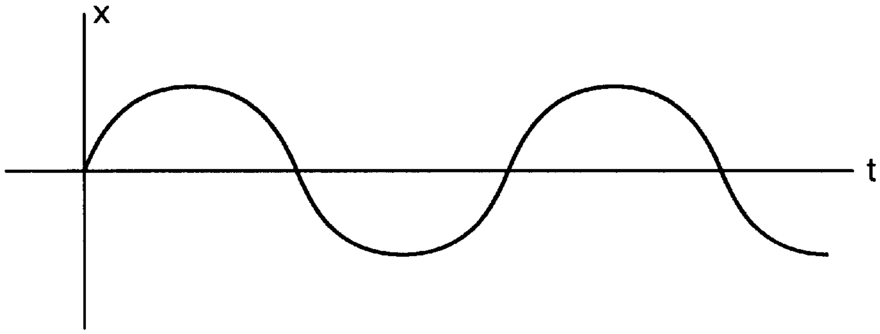
FIG. 2B shows change of position of atoms collimated with a collimating laser beam in one dimensional model.
Figure 2C:
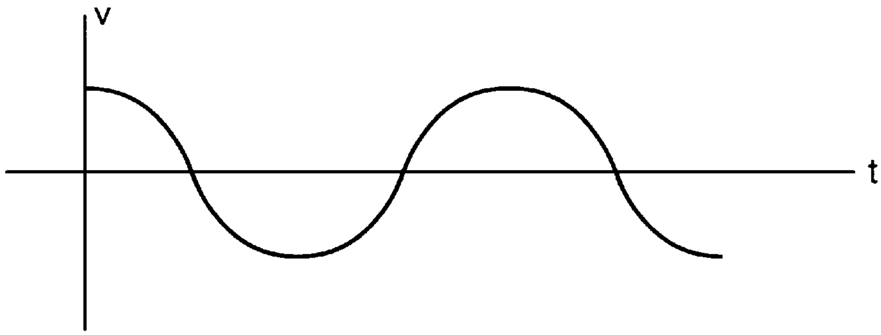
FIG. 2C shows change of velocity of atoms collimated with a collimating laser beam in one dimensional model.

When x(0) is small (that is, when the initial position is very close to the center of the laser beam), changes in the position x in Equation (6) and changes in the velocity $v_x$ in Equation (7) can be expressed by graphs of FIGS. 2B and 2C respectively. In FIG. 2B, the ordinate represents position (x) in the direction vertical to the direction of the laser beam, and the abscissa time (t). In FIG. 2C, the ordinate represents velocity (v) and the abscissa represents time (t).

The position of the atoms changes in the direction vertical to the laser beam as shown in FIG. 2B, and the velocity of the atoms changes with respect to time as shown in FIG. 2C with the dipole force of the laser beam.

In the configuration shown in FIG. 1, the cesium atoms 1*a* are trapped and cooled in the laser trap-cooling section 1 using the conventional atomic-fountain type technology. The laser beam for collimation of the atoms is emitted from the collimation laser generator 5 by turning the switch 4, and at nearly same time, the cooled atoms are tossed and at the same time. Thus the atoms 1*a* are tossed upward in parallel with the traveling direction of the light without dispersed, because of the dipole force caused with the electric field of the laser beam. When the horizontal velocity component of the cesium atoms 1*a* becoming zero, before they reach the microwave resonator 2, the switch 4 is turned off to stop the output of the collimation laser beam. Each of the cesium atoms 1*a* is pushed up with the velocity at that time in the vertical direction. The velocity at that time is set at a level at which the atoms can pass through the hole of the microwave resonator 2 placed above the laser trap. The cesium atoms 1*a* pass through the hole of the microwave resonator 2 upward from the lower side, and as they lose their impetus, the atoms then fall back down by the gravity through the hole of the microwave resonator 2. Since the cesium atoms 1*a* do not diffuse in the horizontal direction during the round trip in the up and down directon, the atoms tossed upwardand passed through the hole can fall back down through the hole with high accuracy (approximately 85% in the calculation). The on and off of the switch is repeated with a cycle predetermined so that the switch 4 is changed from the ON to the OFF in lapse of a settled time, and further changed to ON in a settled time.

Figure 3:
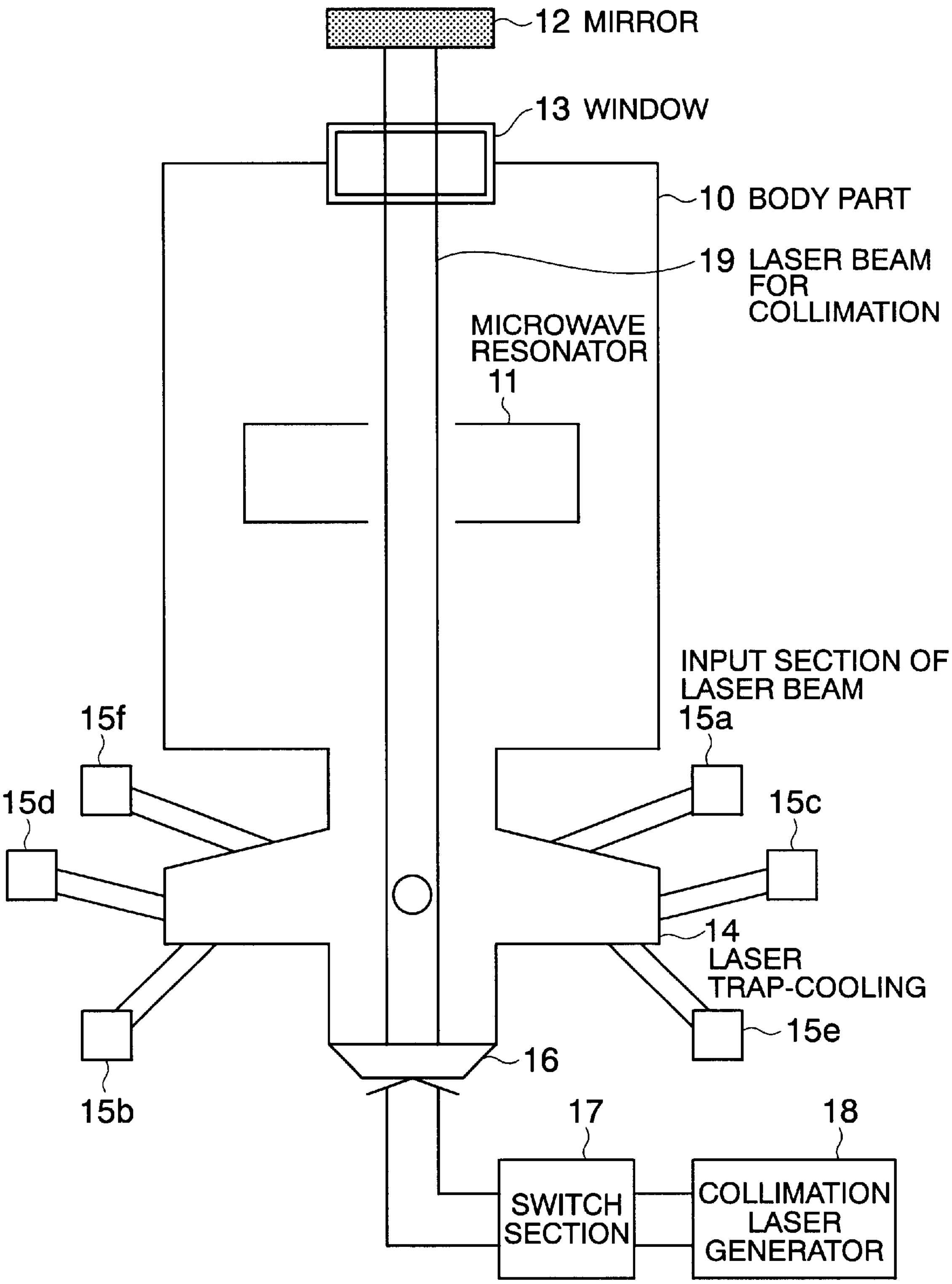
FIG. 3 shows an embodiment of an apparatus of the present invention.
Figure 4:
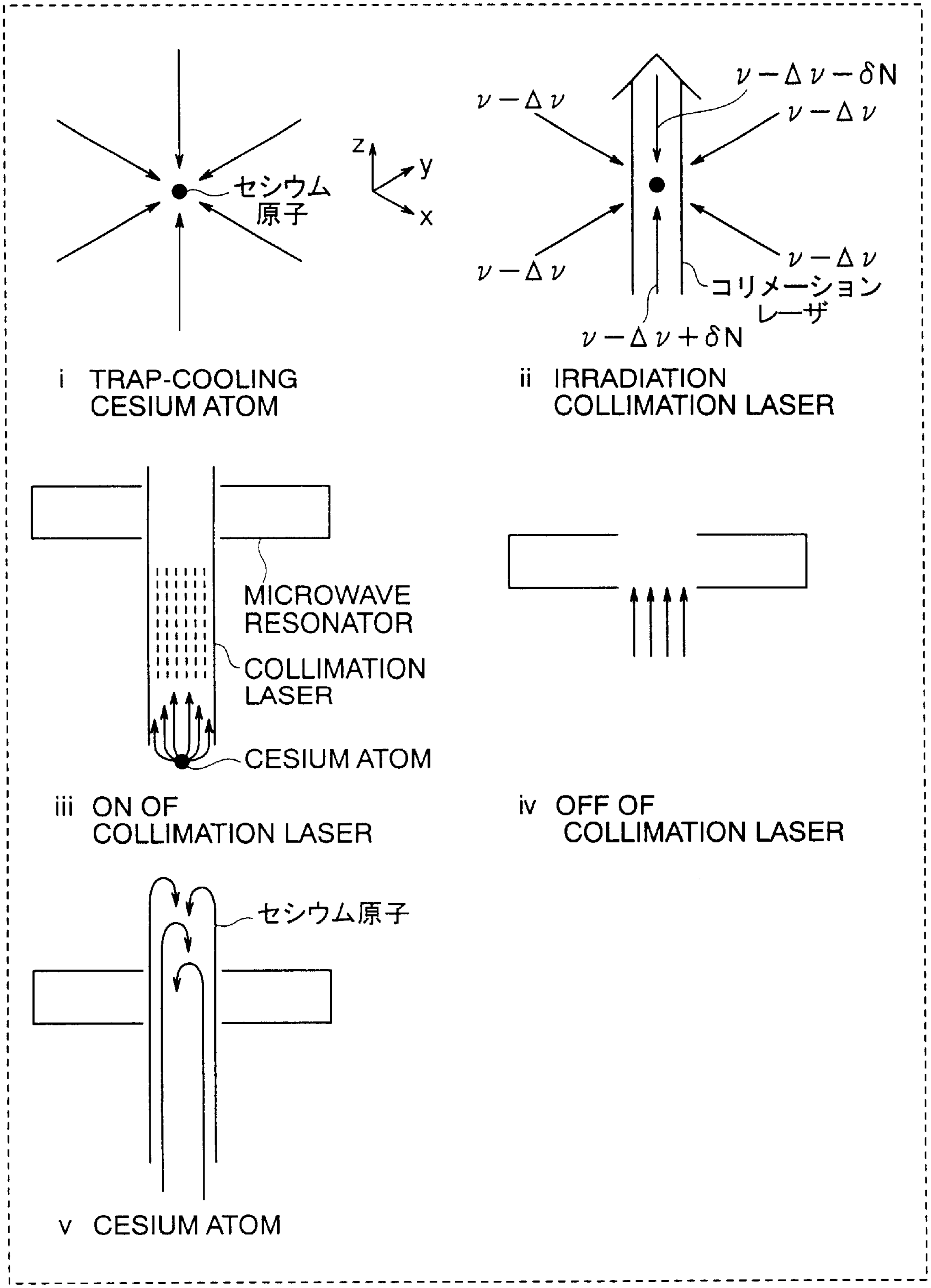
FIG. 4 shows the change of state with time in the present invention.
Figure 5A:
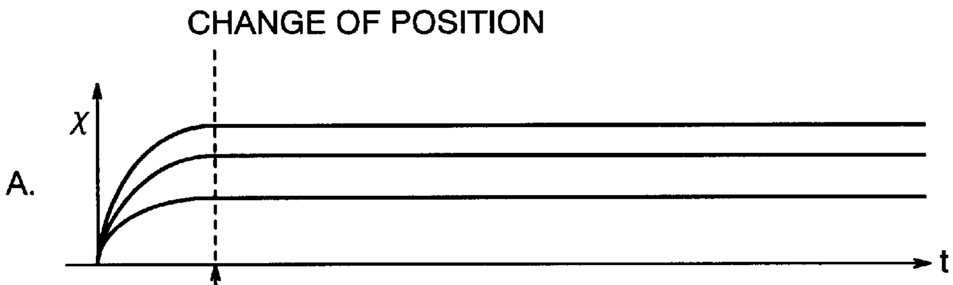
FIG. 5A shows changes in the traveling distance of the cesium atoms with the lapse of time.
Figure 5B:
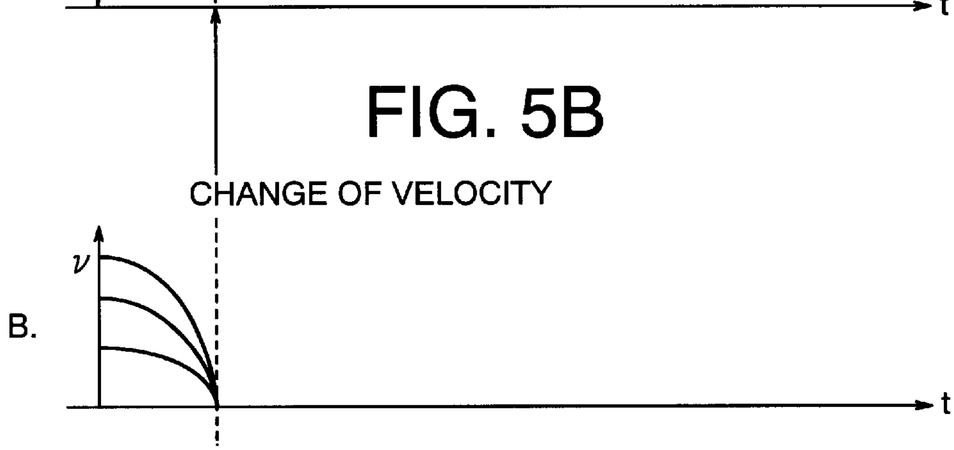
FIG. 5B shows changes of the velocity of the cesium atoms in accordance with the lapse of time.

FIG. 3 shows a configuration of an embodiment of the present invention, FIG. 4 shows operation steps of the embodiment, and FIG. 5A and FIG. 5B show a diagram of changes of the position and velocity of atoms respectively with the lapse of time.

Figure 11:
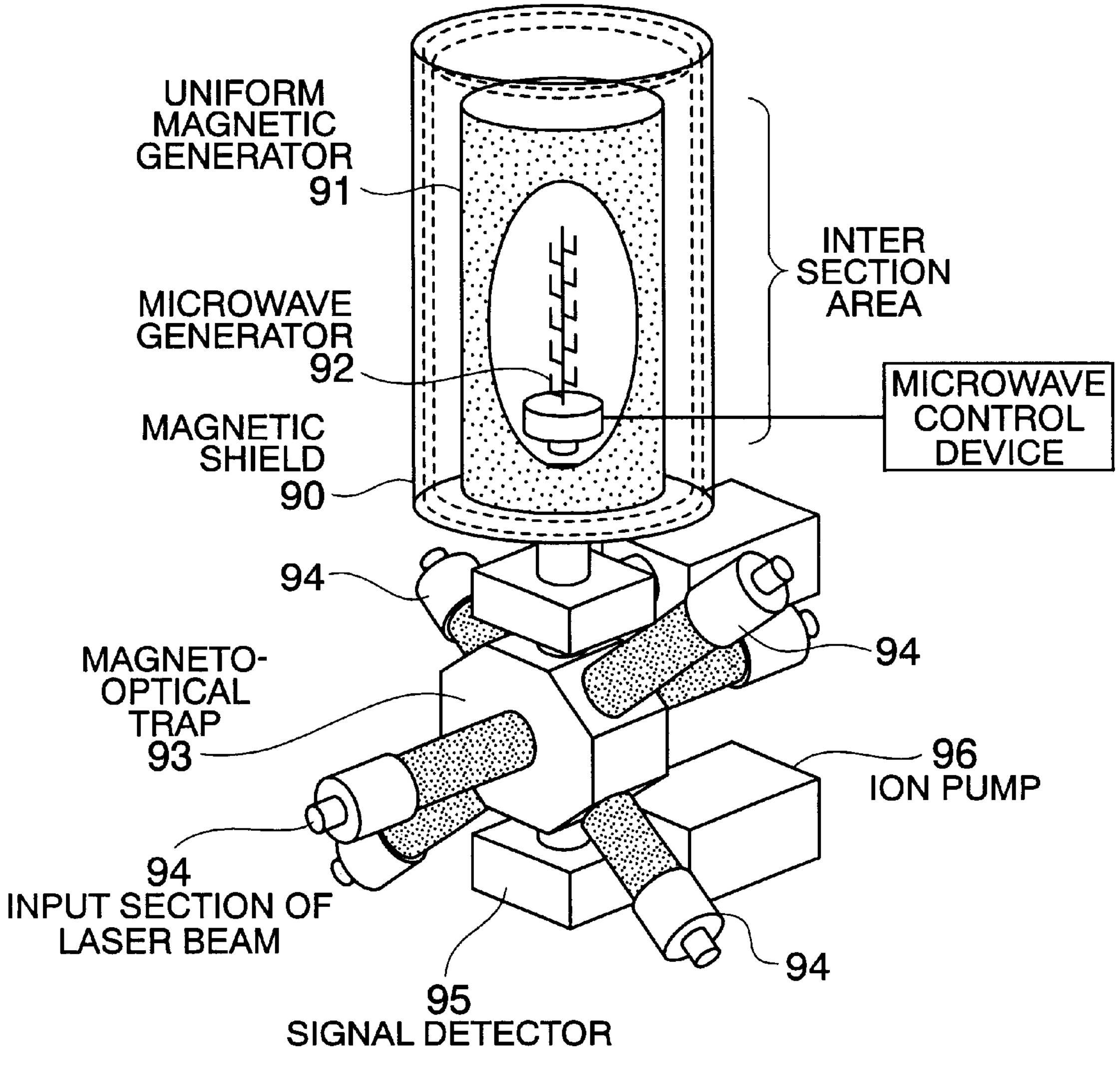
FIG. 11 PRIOR ART
FIG. 11 shows an external view of a conventional atomic-fountain type cesium frequency standard

In FIG. 3, reference numeral 10 refers to a body part of the cesium atomic fountain type frequency standard, 11 refers to a microwave resonator (corresponding to reference numeral 2 of FIG. 1), 12 refers to a mirror reflecting laser beam, 13 refers to a window through which the laser beam goes out and comes in, 14 refers to a laser trap-cooling section for trapping, cooling and tossing up cesium atoms (corresponding to reference numeral 1 of FIG. 1), 15*a*~15*f* refer to laser beam input portions through which the cesium atoms are irradiated with the laser beams from six directions for trapping the atoms, 16 refers to a collimation laser beam input portion for launching the atoms, 17 refers to a switch for turning on and off the collimation laser beam (corresponding to reference numeral 4 of FIG. 1), 18 refers to a collimation laser beam generating section (corresponding to reference numeral 5 of FIG. 1), and 19 refers to a collimation laser beam. Trapping, cooling and tossing the cesium atoms in the construction of FIG. 3 are same with those in apparatus of FIG. 11. Same laser sources are used for the laser trapping, cooling and tossing the atoms. Changing the laser irradiating frequency according to trapping, cooling and tossing can be implemented with an acoustooptical element.

As a laser for the collimation laser generating section 18, a titanium-sapphire laser can be used, but other types of laser can also be used. Note that the signal detecting section is omitted in the FIG. 3.

Now, the operation of the embodiment will be described, referring to FIG. 4. First, the cesium atom 1*a* (including a plurality of atoms) is trapped and cooled in the laser trap-cooling section 14 with the laser beam from each of the input portions 15*a*~15*f*, as shown in "i" of FIG. 4. Thereafter, the cesium atom 1*a* is tossed up, irradiated on the directions with respective frequencies set as shown in "ii" of FIG. 4. At the nearly same time, the switch 17 is turned on to irradiate the laser trap-cooling section 14 from underneath with the laser emitted from the collimation laser generating section 18. The launched cesium atom is gradually decelerated in the horizontal direction (see "iii" of FIG. 4). When the velocity distribution of the atoms in the horizontal direction is the minimum as shown in "iv", where the atoms do not move in the lateral direction, the switch for the collimation laser is turned off. The cesium atoms ascend further vertically through the hole on the microwave resonator, and begin falling back as they lose impetus, as shown in "v". Since the horizontal component of velocity distribution of the atoms is the minimum, most of the cesium atoms falls back downward, following the original path they ascended, through the hole of the microwave resonator.

FIG. 5A, shows changes in the traveling distance of the cesium atoms with the lapse of time. The ordinate represents the horizontal distance from the centerline of the atom wave guide, and the abscissa represents time. After the lapse of the time T, the horizontal distance shows no change, becoming constant. At this time T, the switch 17 for controlling the output of the collimation laser is turned off.

FIG. 5B shows changes of the velocity of the cesium atoms in accordance with the lapse of time corresponding to the time of FIG. 5A. It is shown that the velocity falls to zero after the lapse of the time T at which the switch 17 has been turned off.

The collimation laser beam should preferably be no resonant to prevent the scattering caused by the absorption and emission of the beam. However, the laser requires a great power to obtain a sufficient dipole force for the reason of no resonant. A $CO_2$ laser for the no re sonant, for example, requires a high power as high as about 360 W.

For a case of near-resonant (the frequency being neat the wave length of the atom), a strong dipole force can be obtained even with a weak power. When the frequency is too near to the wave length of the atom, however, the scattering tends to occur frequently. Specifically, a titanium sapphire laser is used as a laser for generating a wave length near to the wave length of the cesium atom. This titanium sapphire laser has an output of 300 mW, a detuning frequency of 1 THz (terahertz: $10^{12}$ Hz), and a spot size of 3 mm. With this laser where the scattering occurs at the frequency of 0.25 Hz, 15% of atoms are subjected to the scattering during the laser radiation of 0.1 sec (where the laser is turned off before the atoms reach the microwave resonator). Consequently, 85% of the atoms are not subjected to the scattering as the no resonant.

Figure 6:
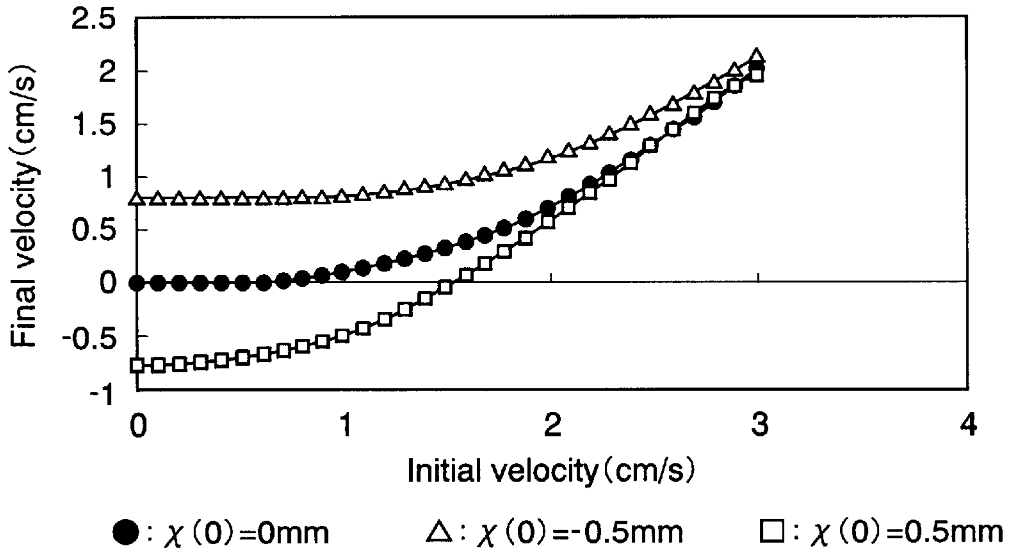
FIG. 6 shows the relation between final and initial velocities

FIG. 6 is a graph showing relations between the final velocity ($v_x$ (T)) and the initial velocity ($v_x$ (0)), the ordinate representing the final velocity when the switch is turned off, and the abscissa representing the initial velocity. This figure shows the changes for each initial position x (0) of three positions (x=0 mm, −0.5 mm, and 0.5 mm) with respect to the central position (the center of the atomic wave guide).

Figure 7:
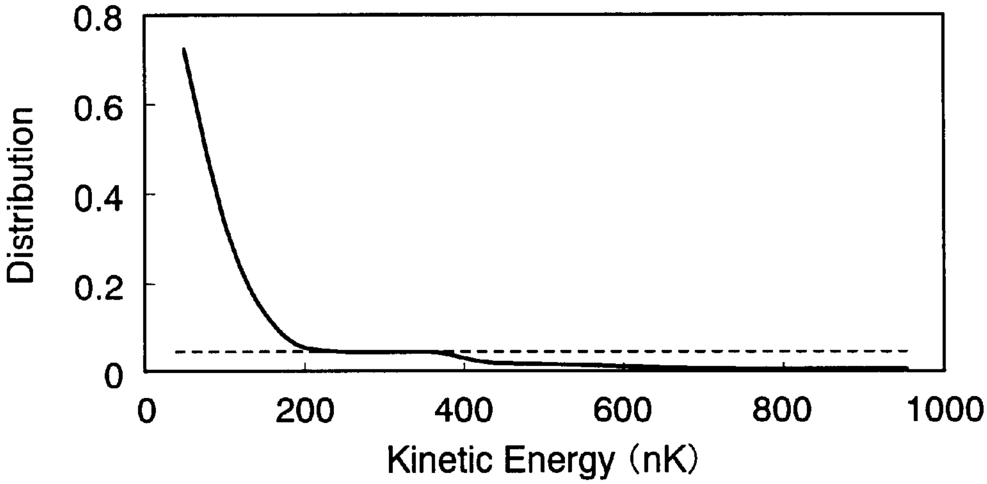
FIG. 7 shows kinetic energy distribution in an example of one-dimensional model

When assuming the distributions ($\rho_x(0)$, and $\rho_{vx}(0)$) of x(0) and $v_x(0)$ are expressed by the following equations (8) and (9), the kinetic energy distribution is shown graphically as shown in FIG. 7. The $\delta_x$ in Equations (8) and (9) represents the distribution width of x(0), and the $\delta_v$ represents the distribution width of V(0). The kinetic energy distribution of t=T is 110 nK, which is corresponding to the velocity estimated by ωδx.

$$P_x(0)=\frac{1}{\delta x\sqrt{\pi}}\exp\left[-\frac{x(0)^2}{(\delta x)^2}\right]\quad \delta x=0.25\text{ mm} \tag{8}$$

$$Pv_x(0)=\frac{1}{\delta v\sqrt{\pi}}\exp\left[-\frac{v_x(0)^2}{(\delta x)^2}\right]\quad \delta x=1.8\text{ cm/s }(2.6\mu K) \tag{9}$$

FIG. 7 is the kinetic energy distribution of the one dimensional model, the abscissa being kinetic energy (in nK), and the ordinate being distribution (in percentage). The characteristic shown by a sold line in FIG. 7 is the energy distribution of thee present invention where the collimation laser beam is irradiated 0.1 sec and the switch is turned off at the time. The characteristic shows that most of the atoms are distributed in areas of low kinetic energy. The characteristic shown in a dotted line is the distribution of energy in the case where the collimation laser beam was not irradiated, the distribution is approximately uniform in the level of about 2.6 μK.

Next, the present invention calculated with two dimensional model considered with cylindrical coordinates will be described. In this case, the electric field E(r) can be expressed by Equation (10), and the dynamic equation in the radial direction is expressed by Equation (11). L in Equation (11) denotes an angular momentum component parallel to the laser beam, and $L^2/r^3$ denotes a centrifugal force.

$$E(r)=E_0\exp\left[-\frac{r^2}{2(\Delta r)^2}\right] \tag{10}$$

$$\frac{d^2r}{dt^2}=-\varpi^2 r\exp\left[-\frac{r^2}{(\Delta r)^2}\right]+\frac{L^2}{r^3} \tag{11}$$

Kinetic energy is expressed by the following equation (12).

$$K(t)=\frac{M}{2}\left[v_r(t)^2+\left[\frac{L}{r(t)}\right]^2\right] \tag{12}$$

Now, a specific example of calculation for cesium (Cs) atoms with the following conditions will be shown. T denotes an off time in the following.

$\Delta r$=1.5 mm, $T$=0.1 $s$(ω=2π×2.5 radian/$s$)

The distribution of r(0) and $v_r(0)$ (expressed as $\rho_r(0)$, $\rho V_r(0)$) is expressed by Equations (13) and (14) where δr is 0.25 mm, δv is 1.8 cm/s (2.6 μK).

$$Pr(0) = \frac{2r(0)}{\pi(\delta r)^2}\exp\left[-\frac{r(0)^2}{(\delta r)^2}\right] \quad \delta r = 0.25 \text{ mm} \tag{13}$$

$$Pv_r(0) = \frac{2v_r(0)}{\pi(\delta v)^2}\exp\left[-\frac{v_r(0)^2}{(\delta v)^2}\right] \quad \delta v = 1.8 \text{ cm/s } (2.6\mu K) \tag{14}$$

Figure 8:
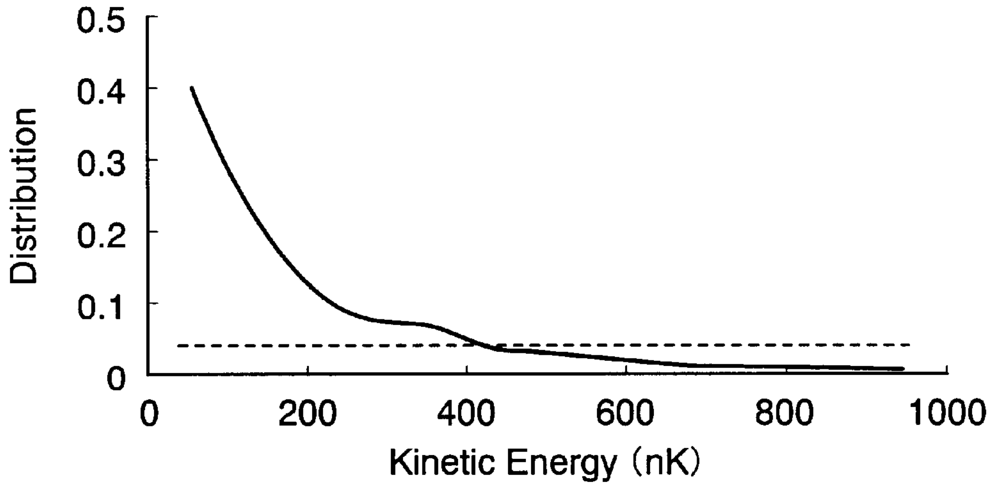
FIG. 8 shows kinetic energy distribution in an example of two-dimensional model
Figure 9:
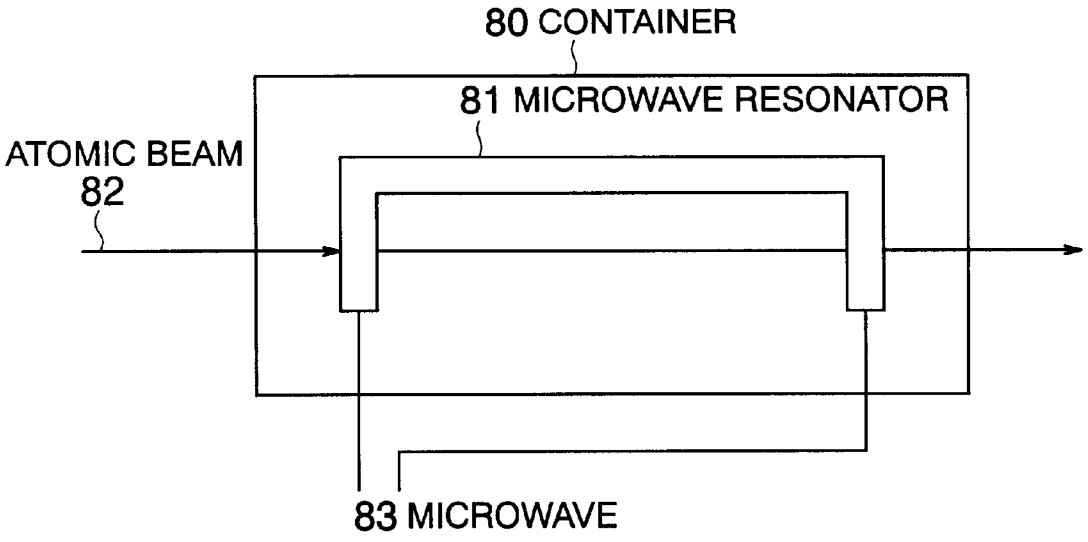
FIG. 9 PRIOR ART
FIG. 9 shows the operating principle of a conventinal beam-type cesium frequency standard
Figure 10A:
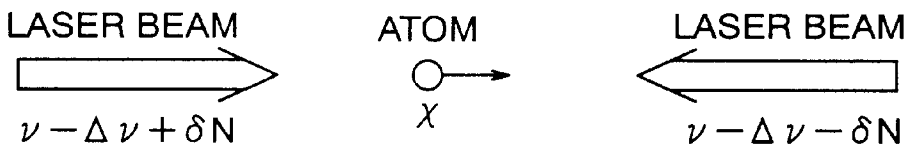
FIG. 10A shows a drawing explaining a principle of an atomic fountain.
Figure 10B:
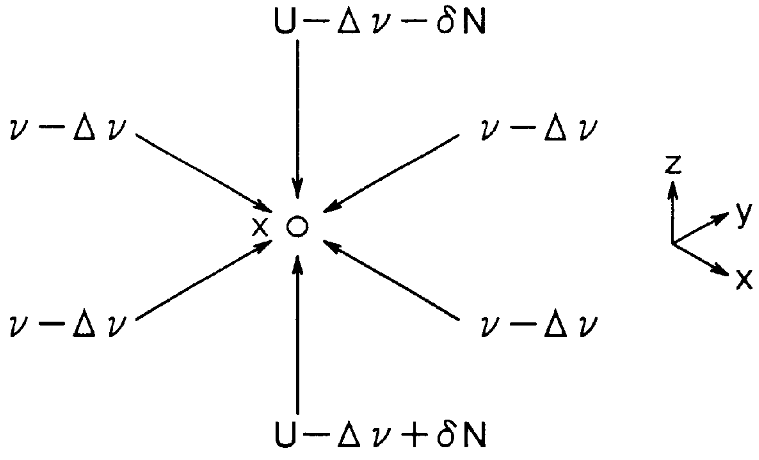
FIG. 10B shows a drawing explaining a principle of an atomic fountain.
Figure 10C:
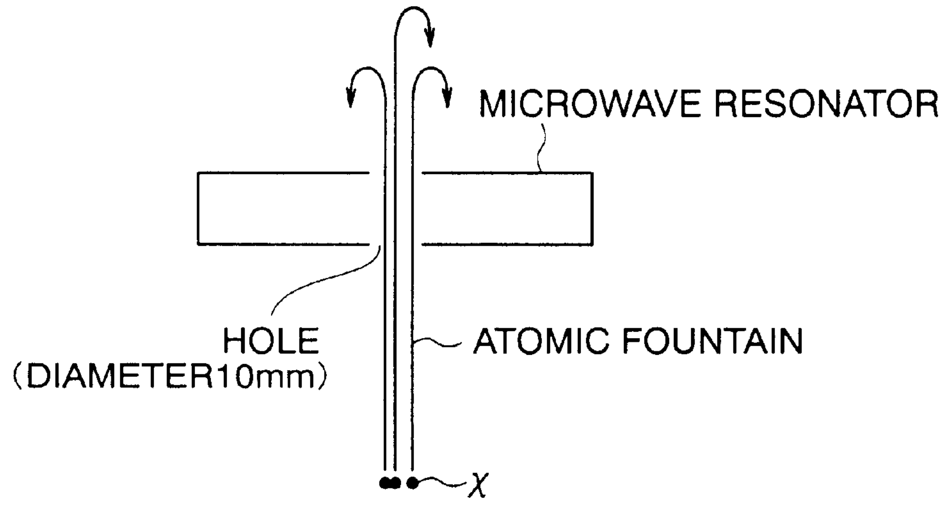
FIG. 10C shows the atomic fountain.

The kinetic energy distribution of the two dimensional model calculated above is shown in FIG. 8. The abscissa and ordinate in FIG. 8 represent kinetic energy and distribution, respectively. The kinetic energy distribution when t=T corresponds to 180 nK.

When infrared laser beam, which is non resonant, is used as the collimation laser beam for causing the dipole force, a kinetic energy after the interaction of the atom and the photon is lower than single photon recoil, because the heating effect due to scattering can be avoided. The required apparatus may be simpler than that for Raman cooling.

What is claimed is:

1. Atomic fountain apparatus trapping, cooling and tossing upward atoms with a plurality of laser beams comprising:

a collimation laser generating section for generating laser beam of a frequency that does not resonate with the atoms, wherein the collimation laser beam output by the collimation laser generating section is applied to the atoms in the direction of the tossed atoms to collimate the tossed atoms.

2. Atomic fountain apparatus in claim 1 comprising:

a switch for controlling off of irradiation of the laser beam output from the collimation laser generating section;

wherein the switch is turned on to out put the laser beam by the collimation laser generating section at the time tossing the atoms, and turned off at the time that horizontal velocity components of the atoms become nearly zero.

3. An atomic fountain apparatus trapping, cooling and tossing upward atoms with a plurality of laser beams, and comprising a microwave resonator, wherein the atoms pass upward fall back through a microwave resonator comprising:

a collimation laser generating section for generating laser beam of a frequency that does not resonate with the atoms; and a switch for controlling on and off of the light output from the collimation laser generating section;

wherein the collimation laser beam output by the collimation laser generating section is applied to the atoms in the direction of the tossed atoms, and the switch is turned off before the atoms reaches the microwave resonator.

4. An atomic fountain apparatus in claim 3: wherein the atoms are cesium.

5. An atomic fountain apparatus in claim 4: wherein the cesium atoms passing through the microwave resonator without dispersing from the atomic wave guide even after the switch has been turned off.

6. An atomic fountain apparatus in claim 4: wherein a carbon dioxide laser of a frequency that does not resonate with the cesium atoms is used as the laser beam output from the collimation laser generating section.

7. An atomic fountain apparatus in claim 4: wherein a titanium sapphire laser is used as the laser beam output from the collimation laser generating section.

* * * * *